United States Patent [19]
Varner

[11] Patent Number: 4,852,935
[45] Date of Patent: Aug. 1, 1989

[54] RETRACTABLE BACKLIGHT
[75] Inventor: Donald Varner, Allen Park, Mich.
[73] Assignee: ASC Incorporated, Southgate, Mich.
[21] Appl. No.: 155,824
[22] Filed: Feb. 16, 1988
[51] Int. Cl.[4] .............................................. B60J 1/18
[52] U.S. Cl. ................................... 296/146; 296/107; 296/201
[58] Field of Search ............... 296/146, 145, 107, 201; 49/260, 249, 250

[56] References Cited
U.S. PATENT DOCUMENTS

| | | | |
|---|---|---|---|
| 2,714,035 | 7/1955 | Limberg et al. | 296/146 |
| 2,747,921 | 5/1956 | Hooverson et al. | 296/146 |
| 2,747,923 | 5/1956 | McLean | 296/146 |
| 3,332,169 | 7/1967 | Lohr et al. | 296/146 |
| 3,333,362 | 8/1967 | Kostin et al. | 49/242 |
| 3,346,297 | 10/1967 | Colantti et al. | 296/146 |
| 4,543,747 | 10/1985 | Kaltz et al. | 49/249 |

Primary Examiner—Robert R. Song
Attorney, Agent, or Firm—Arnold S. Weintraub; Gerald R. Black

[57] ABSTRACT

The invention is a backlight assembly which attaches to the roof section to form a convertible top of a vehicle when the roof and the assembly are both in the raised positions. The backlight assembly and the roof section have independent linkage mechanisms which allow each to be positioned independent of the other. The predetermined path of the backlight panel as defined by the linkage mechanism and the guideframe combines both rotational and sliding movements. This is accomplished by initially radically rotating the panel in a counterclockwise manner and then moving the panel along a substantially horizontal plane. When the backlight panel reaches the extreme rearward portion of the guidetracks, the panel is situated in a substantially horizontal position beneath the rear decklid.

5 Claims, 4 Drawing Sheets

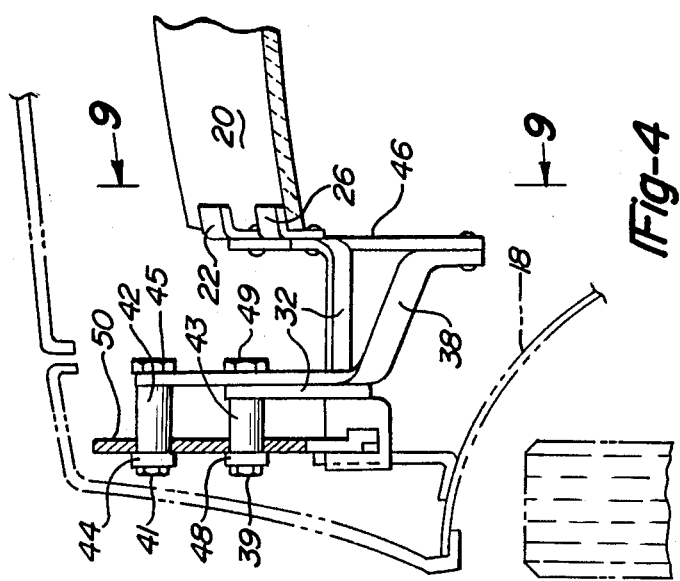
Fig-3
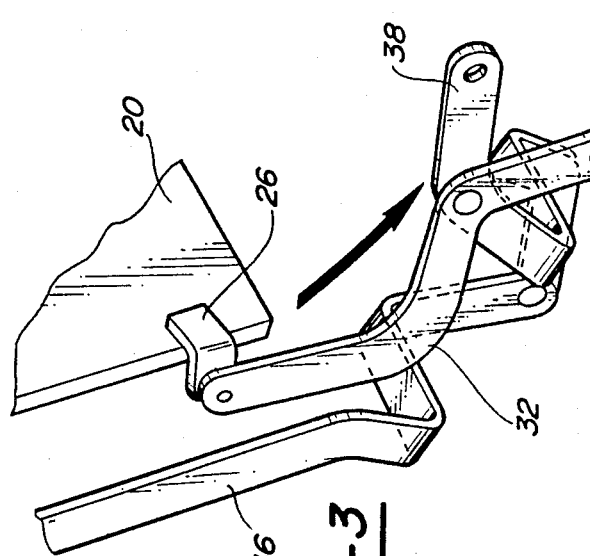
Fig-4
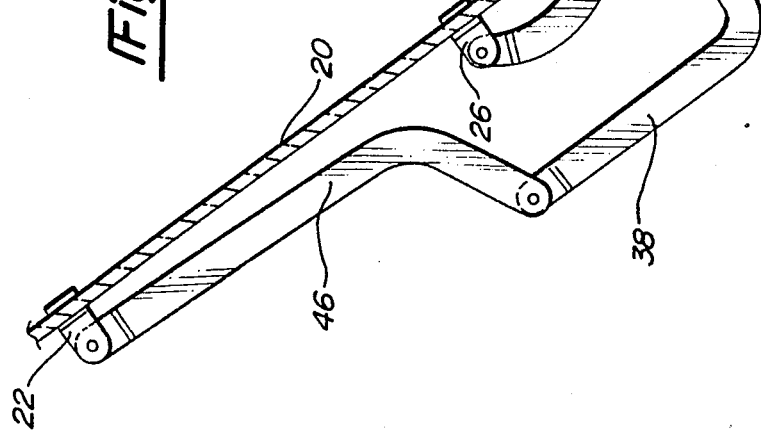
Fig-5
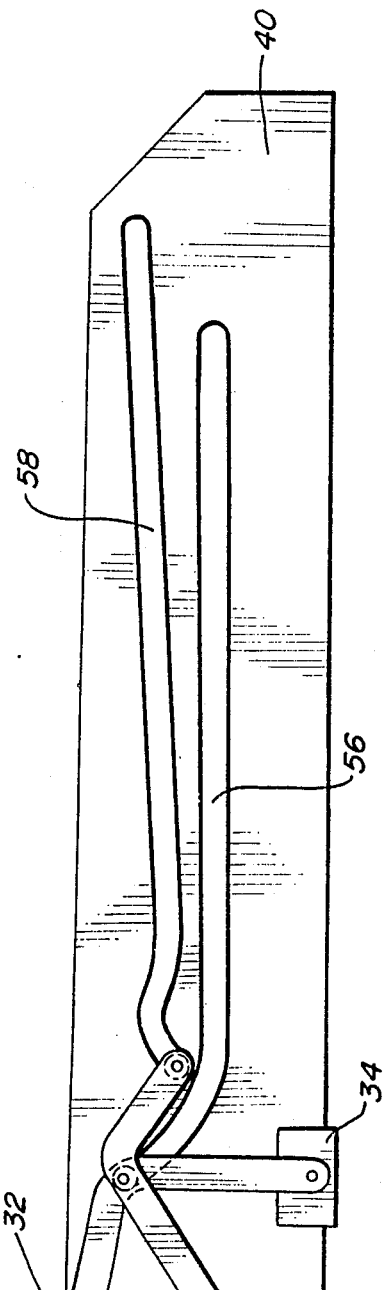

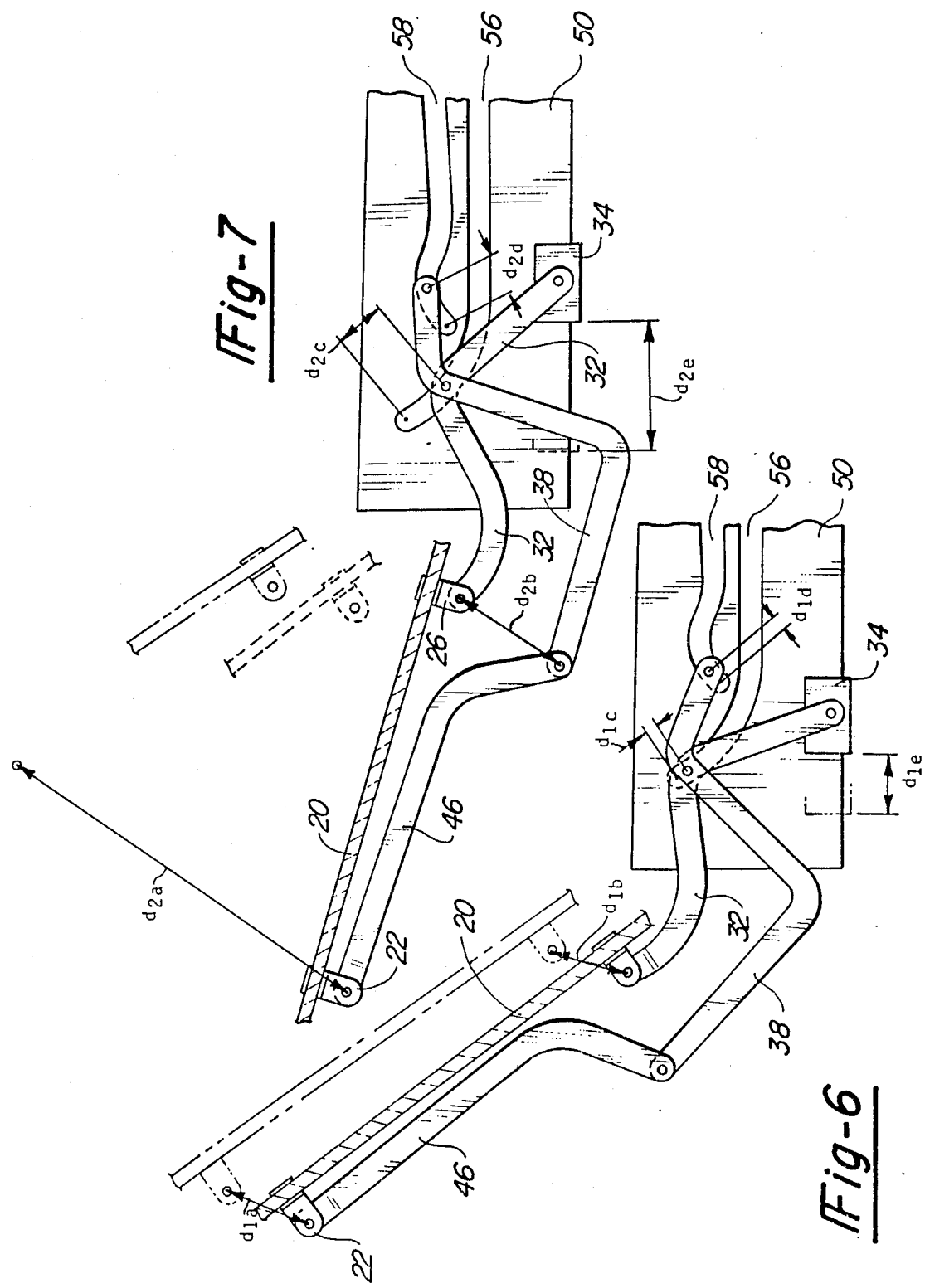

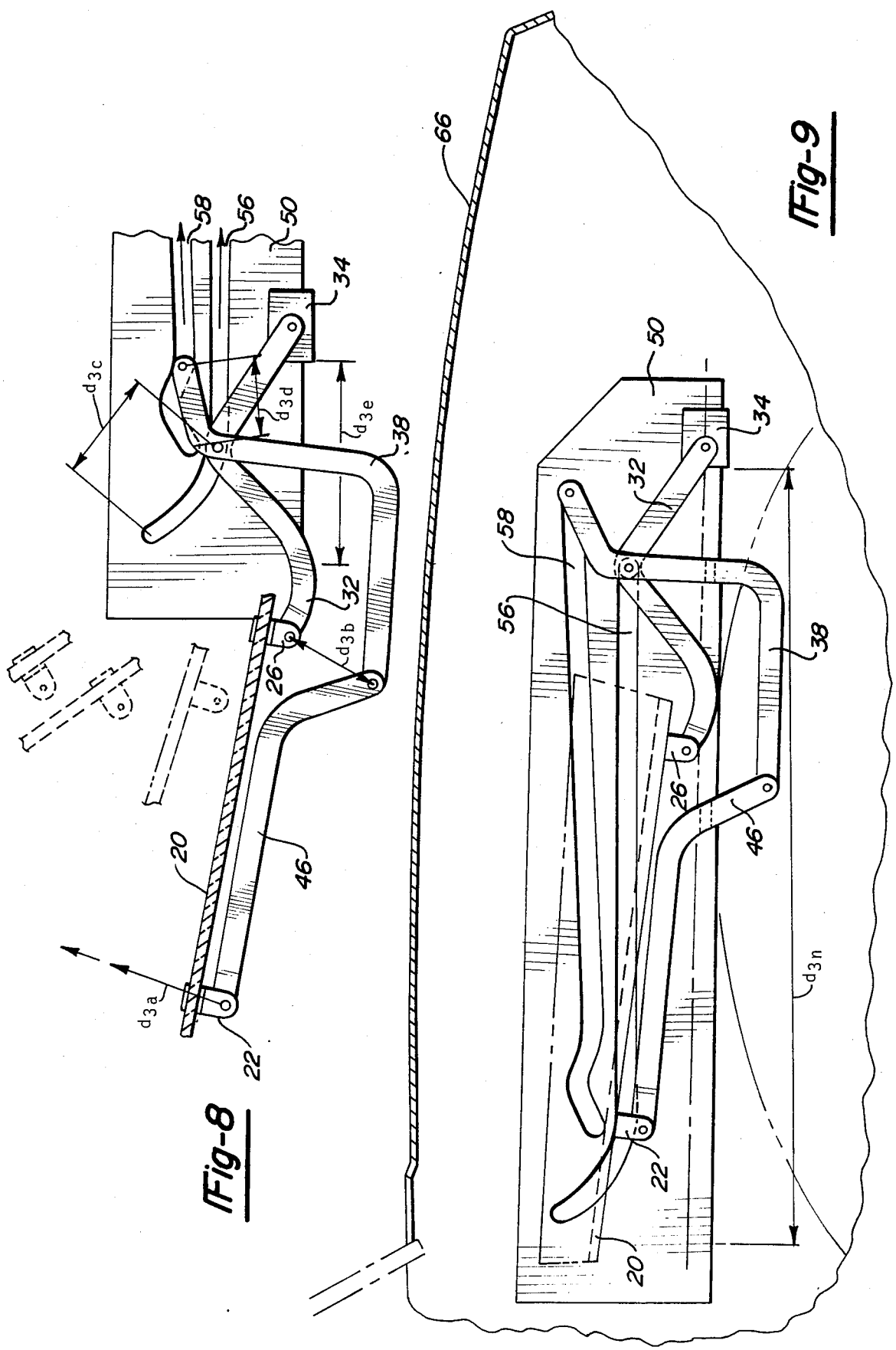

RETRACTABLE BACKLIGHT

BACKGROUND OF THE INVENTION

1. Field of the Invention

This invention relates generally to retractable backlight assemblies, and more particularly, to backlight assemblies that are attachable to the rear section of convertible vehicles.

2. Background Art

The use of backlight or rear window assemblies for convertible tops which enable viewing through the rear of the vehicle are well-known in the art. A wide variety of mechanisms have been designed for mounting and positioning the backlights assemblies.

U.S. Pat. No. 2,714,035 discloses a fluid-actuated, retractable backlight panel having a pair of scissor-type arms which are connected to the panel. The mechanism provides for movement of the backlight panel in directions angular to the plane in which the scissor arms move.

U.S. Pat. No. 2,747,921 discloses a retractable rear window assembly wherein a spring-biased, package shelf adjacent to the window is horizontally movable. A portion of the package shelf is cammed forward by the window as the window moves by fluid power into its retracted, vertical position.

U.S. Pat. No. 2,747,923 discloses a retractable cresent-shaped backlight panel moves between a retracted and a raised position about an axis of rotation, as a hydraulic cylinder moves the backlight panel along an arcuate path. The backlight panel moves independent of the convertible roof.

U.S. Pat. No. 3,332,169 discloses a retractable backlight mechanism which moves the backlight panel between a retracted, horizontal position nested compactly within the body and a raised generally vertical position in tight sealing engagement with the body top structure. The mechanism is power driven by a quadrialateral regulator linkage and a pair of guide assemblies move the window between the raised and the retracted positions.

U.S. Pat. No. 4,543,747 discloses a retractable backlight assembly which includes arcuate-shaped guide tracks mounted within the vehicle on opposite sides of the backlight panel. Rollers driven by a drive motor are connected to the backlight panel and ride within the guide tracks to move the backlight panel between a raised angled position closing the rear opening in the vehicle top structure and a retracted, vertical position within the interior of the vehicle. The patent disclosure is hereby incorporated by reference.

The design of new vehicles requires optimal visiblity around the vehicle, and in particular, unrestricted rear vision. The larger backlight panels necessitate the use of sophisticated linkages which automatically rotate the backlight panel behind the rear passenger seat and for storage of the backlight panel in a compact orientation inside the vehicle.

SUMMARY OF THE INVENTION

The present invention provides a backlight assembly that can be retracted independently of the convertible top, and stored within the interior of the vehicle beneath the rear decklid in a substantially horizontal position. A horizontal storage is preferred over vertical or slanted storage since a horizontal storage of the backlight panel more closely resembles the lines of the vehicle for purposes of efficient space utilization. Such storage may occur near the top portion of the decklid, thereby enabling minimal interference with the storage capacity of the trunk.

The invention also allows the use of a large size backlight panel for positioning and attachment to the roof section by automatic remote control from inside the vehicle, thereby eliminating problems associated with manual engagement and disengagement. Independent retraction of the backlight panel from the roof section allows the vehicle to be operated with the roof section raised, but the backlight panel in the retracted position. Hence, the vehicle can have improved ventilation without requiring the driver to leave the driver's seat.

The backlight panel is movable between a retracted position and a raised position. In the retracted position the backlight panel is positioned within an opening in the rear deck of the vehicle body and entirely below the decklid. In the raised position the backlight assembly projects out of the opening above the deck cooperating with the roof section to cover the passenger compartment of the vehicle. A conventional roof section is preferably made of a flexible material.

The invention is a backlight assembly for a convertible vehicle. A backlight panel is attached to a rear opening of the roof section of the convertible top when the top and the panel are in a raised position. The backlight panel is in a substantially horizontal alignment detached from the top and situated under a decklid when the panel is in a retracted position. The backlight panel is pivotally attached to a linkage mechanism.

A reversible drive motor provides the power for disposing the backlight panel between a raised position and a retracted position. The motor is attached to a driver-track member of the linkage mechanism. The driver-track is slidably affixed to a guideframe by cooperating with intregal tracklip and slides thereon in a substantially horizontal direction when energized. When the driver-track is positioned at the forward portion of the guideframe, the backlight panel is in the raised position. When the driver-track is positioned at the rearward portion of the guideframe, the backlight panel is in the retracted position.

The predetermined path of the backlight panel as defined by the linkage mechanism and the guide frame combines both rotational and sliding movements. This is accomplished by initially radically rotating the panel in a counterclockwise manner and then moving the panel along a substantially horizontal plane. When the backlight panel reaches the extreme rearward portion of the guidetracks, the panel is situated in a substantially horizontal position beneath the rear decklid.

For a more complete understanding of the retractable backlight assembly, reference is made to the following detailed description and accompanying drawings in which the presently preferred embodiment of the invention is illustrated by way of example. It is expressly understood, however, that the drawings are for purposes of illustration and description only, and are not intended as a definition of the limits of the invention.

BRIEF DESCRIPTION OF THE DRAWINGS

FIG. 3 is an assembly view of the FIG. 2 embodiment, showing the backlight panel in the raised position mounted to the left-side linkage assembly;

FIG. 4 is a sectional view from the trunk of the automobile taken along lines 4—4 of the FIG. 1, showing the linkage mechanism and the guideframe in the retracted position and relative to the right rear wheel-well of the automobile;

FIG. 5 is a side elevation of the FIG. 3 embodiment, showing the linkage mechanism and the backlight panel in the raised position relative to the guideframe;

FIG. 6 is another side elevation of the FIG. 3 embodiment, showing the linkage mechanism and the backlight panel in a first intermediate position relative to the guideframe;

FIG. 7 is another side elevation of the FIG. 3 embodiment, showing the linkage mechanism and the backlight panel in a second intermediate position relative to the guideframe;

FIG. 8 is another side elevation of the FIG. 3 embodiment, showing the linkage mechanism and the backlight panel in a third intermediate position relative to the guideframe; and FIG. 9 is another side elevational of the FIG. 3 embodiment, showing the linkage mechanism, and the backlight panel in the retracted position relative to the guideframe.

DETAILED DESCRIPTION OF THE INVENTION

Figure 1:
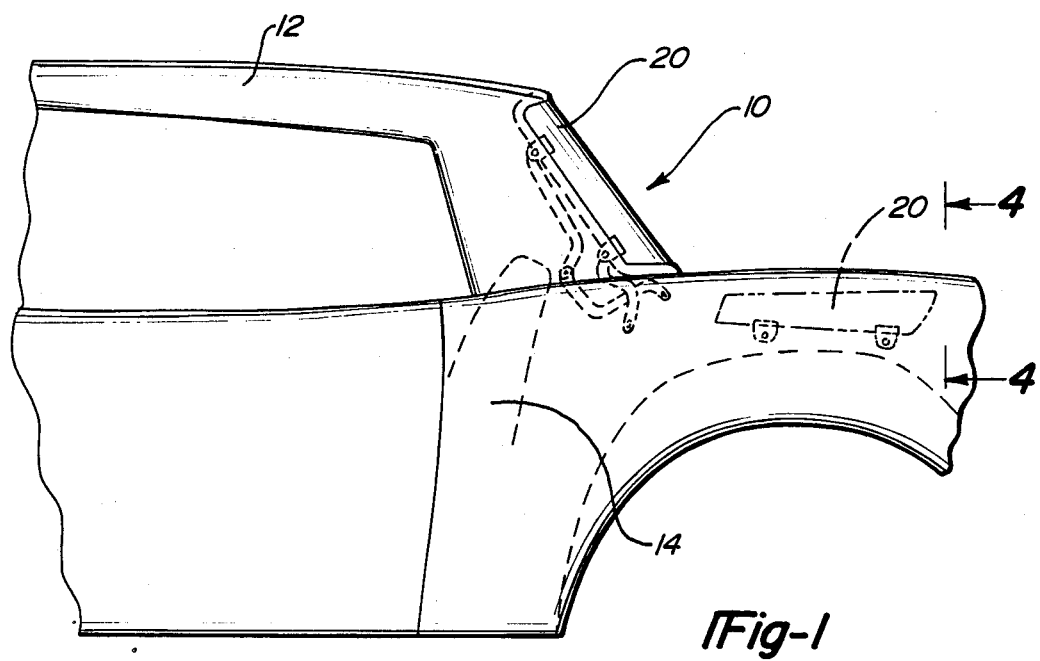
FIG. 1 is a left-side view of the backlight assembly of FIG. 2 in relation to a convertible automobile, with both the backlight assembly and the roof section in the raised position.

To simplify the following description, the components on only one side of the backlight panel are described except where otherwise noted, and similar components on the opposite side are designated by like reference characters. Also, throughout the description and drawings, identical reference numbers refer to the same component throughout the several views.

Referring now to the drawings, FIG. 1 depicts an environmental view of the left-side of a backlight assembly 10 in relation to a convertible automobile having a roof section 12. Both backlight assembly 10 and roof section 12 are in the raised positions. Roof section 12 includes a suitable drive and linkage mechanism (not shown) which operate independently of backlight assembly 10. Roof section 12 folds into a retracted position and is stored behind the rear seat 14 of the automobile.

Backlight assembly 10 comprises a generally rectangular and transparent backlight panel 20, a linkage mechanism 30 located on each side of panel 20, a guideframe 50 located on each side of panel 20 which cooperates with each linkage mechanism 30, and a power source or means 60 which drives each linkage mechanism 30. Mechanisms 30 are pivotally connected to each side of panel 20 for purposes of positioning. A pair of spaced guideframes 50 mounted within the vehicle on opposite sides of the retractable backlight panel 20, are rotatably engaged to linkage mechanism 30. Guideframes 50 provide controlled movement of backlight panel 20 between the raised position and the retracted position. Backlight assembly 10 is attachable and sealable to roof section 12 which forms the convertible top assembly when both assembly 10 and section 12 are in the raised positions. FIG. 1 also shows backlight panel 20 in phantom in the substantially horizontal, retracted position.

Figure 2:
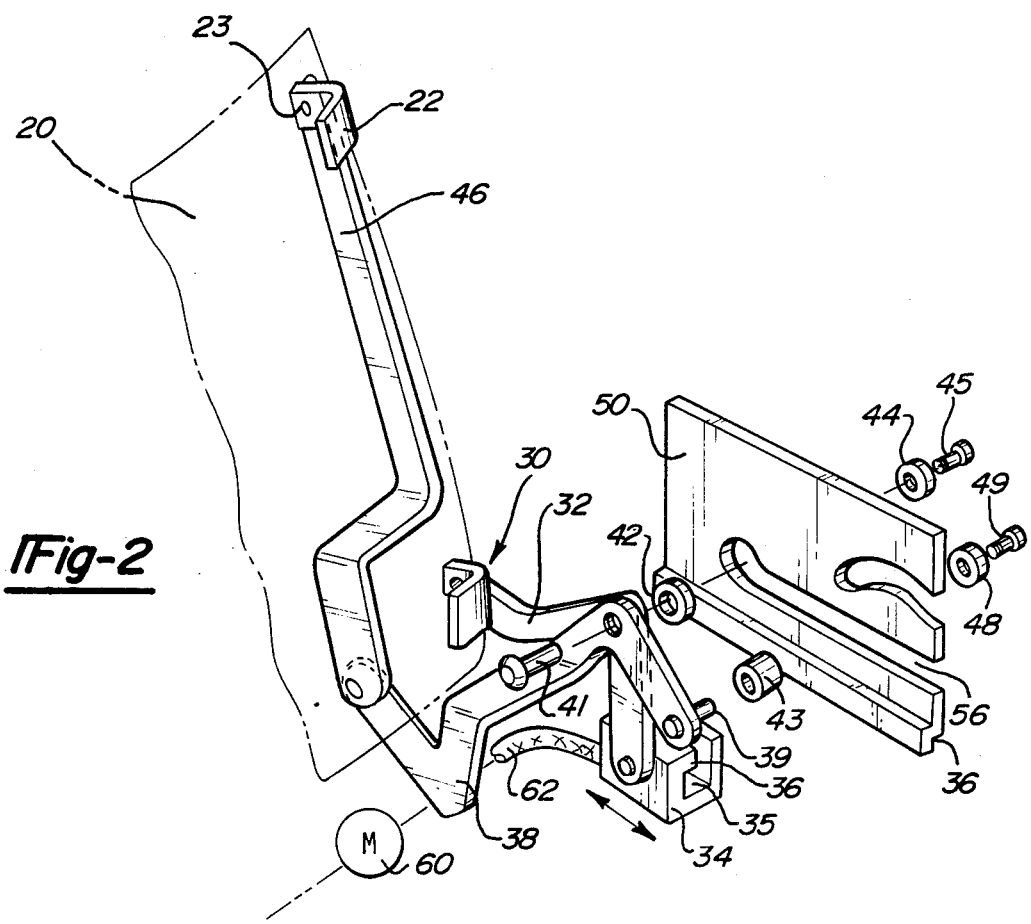
FIG. 2 is an assembly view of the right-side backlight assembly of the preferred embodiment of the present invention, showing the backlight panel, the linkage mechanism and the guideframe in the raised position.

Referring to FIG. 2, the right-side of backlight assembly 10 is depicted, with backlight panel 20, linkage mechanism 30 and guideframe 50 shown in the raised position. Linkage mechanism 30 is pivotally connected to backlight panel 20, and includes a drive-link member 32, a driver-track 34, an intermediate-link member 38, and an elongated-link member 46.

The top end of elongated-link member 46 is secured to backlight panel 20 by a bracket 22 and a fastener 23. The other end of elongated-link member 46 is pivotally attached to intermediate-link member 38. Intermediate-link member 38 is pivotally attached to driver-link member 32 by a pin 41 and roller coupling 42. Pin 41 then extends through both intermediate-link member 38 and driver-link member 32 near the bottom portion of each link respectively, and engages a roller sleeve 44 and a pin 45 through an elongated guide slot 56 on guideframe 50. The lower end of intermediate-link member 38 has an integral protruding finger 39 and roller coupling 43, as finger 39 then engages roller sleeve 48 and pin 49 through an elongated guide slot 58 on guideframe 50.

The top end of driver-link member 32 is secured to backlight panel 20 by a bracket 26 and a fastener 28. The lower portion of drive-link member 32 cooperates with intermediate-link member 38, as described above. The lower end of drive-link member 32 is pinned to driver-track 34. Driver-track 34 has a generally cubical shape and is pivotally attached to drive-link member 32. Driver-track also has an integral groove 35 and an integral lip 36. Groove 35 is mounted onto a flange 52 on guideframe 50, and is slidably affixed thereto as backlight panel 20 moves between the raised position to the retracted position, and back again to the raised position, as driver-track 34 is power driven back and forth across flange 52.

Elongated-link member 46 is straight along its entire length, except for a downward, inward bend near the bottom portion thereof. One end of elongated-link member 46 is secured to the top of backlight panel 20 and the other end is pinned to intermediate-link member 38. Intermediate-link member 38 has four different radical bends. Slightly below the pin engagement to elongated-link member 46, intermediate-link member 38 incurs a substantially normal bend upwards along its length, and thereafter undergoes a substantially normal downward bend. Thereafter, intermediate-link member 38 undergoes a substantially normal, and upward lateral bend. The last bend is lateral and downward. It is at the point of this last bend that intermediate-link member 38 is pivotally attached to drive-link member 32.

To retract backlight panel 20 from roof section 12, power means 60 is energized. Driver-track 34 moves rearwards along guideframe 50 rotating the interconnected linkages to lower the bottom edge of backlight panel 20. Linkage mechanism 30 moves through elongated guide slots 56 and 58 mounted in guideframe 50, which provide for the controlled movement during the repositioning of backlight panel 20. Guideslots 56 and 58 extend in a horizontal direction and define the movement path of backlight panel 20 through the trunk and into the retracted position. Finger 39 is slidably engaged with guide slot 58, and pin 41 is slidably engaged with guide slot 56. The forward portion of guide slots 56 and 58 are radically curved so that when combined with the curvature of the linkages, backlight panel 20 is tilted and rotated in a counterclockwise manner and immediately into a substantially horizontal position for entry into the trunk. Driver-track 34 moves along flange 52 which is integral to guideframe 50, in a substantially horizontal direction, parallel to the retracted position of backlight panel 20.

FIG. 3 is an assembly view showing another perspective of intermediate-link member 38 and driver-link member 32, with backlight panel 20 in the raised position mounted to left-side linkage mechanism 30. FIG. 4 is a sectional view of linkage mechanism 30 shown in the retracted position as seen from the trunk of the automobile taken along lines 4—4 of FIG. 1, relative to the left rear wheel-well 18 of the automobile.

FIGS. 5, 6, 7, 8, and 9 depict side elevations of backlight panel 20 and linkage mechanism 30 relative to guideframe 50. FIG. 5 depicts backlight assembly 10 is in the raised position, FIGS. 6, 7 and 8 depicts assembly 10 in a series of intermediate positions, and FIG. 9 depicts backlight assembly 10 in the retracted position.

FIGS. 6 is a first intermediate position, FIG. 7 is a second intermediate position, and FIG. 8 is a third intermediate position showing backlight panel 20 and linkage mechanism 30 relative to guideframe 50 as backlight assembly 50 is lowered into a retracted position.

In the first intermediate position as shown in FIG. 6, backlight panel 20 is moving behind rear seat 14 and under decklid 66, as backlight mounted fasteners 23, and 25 have begun a downward and counterclockwise rotation as guide slot pins 41 and 45, and driver-track 34 have initiated rearward sliding movement within guideframe 50. The distances traveled by fasteners 23 and 25, pins 41, and 45 and drive-track 34 as backlight assembly 10 rotates between the raised position and the first intermediate position, are depicted in FIG. 6, and are represented by $d_{1a}$, $d_{1b}$, $d_{1c}$, $d_{1d}$, and $d_{1e}$ respectively. The raised positin of backlight panel 20 (as depicted in FIG. 5) is shown in phantom in FIG. 6.

The distances traveled by backlight mounted fasteners 23 and 25, guide slot pins 41 and 45, and drive-track 34 as backlight assembly 10 rotates etween the raised position and the second intermediate position, are depicted in FIG. 7, and are represented by $d_{2a}$, $d_{2b}$, $d_{2c}$, $d_{2d}$, and $d_{2e}$ respectively. The raised position (as depicted in FIG. 5) and the first intermediate position (as depicted in FIG. 5) and the first intermediate position (as depicted in FIG. 6) of pin 25 are shown in phantom in FIG. 7. In this second intermediate position, backlight panel 20 has nearly completed its rotation into a horizontal orientation, as pins 23,and 25 are now nearly both located on the same horizontal plane, as guide slot pins 41 and 45, and driver-track 34 have moved only relatively short distances within guideframe 50.

The distances traveled by backlight mounted fasteners 23 and 25, guide slot pins 41 and 45, and drive-track 34 as backlight assembly 10 rotates between the raised position and the third intermediate position, are depicted in FIG. 8, and are represented by $d_{3a}$, $d_{3b}$, $d_{3c}$, and $d_{3e}$ respectively. The raised position (as depicted in FIG. 5), the first intermediate position (as depicted in FIG. 6), and the second intermediate position (as depicted in FIG. 7) of pin 25 are shown in phantom in FIG. 8. In this third intermediate position, backlight panel 20 has essentially completed its counterclockwise rotation, as fasteners 23 and 25 are both located on the same horizontal plane, as pins 41 and 45 and driver-track 34 have still moved only relatively short distances within guideframe 50.

Hence, backlight panel 20 rotates immediately into a substantially horizontal position even though guide slot pins 41 and 45, and driver-track 34 have moved relatively short distances compared to their total path lengths as shown in FIG. 9, the retracted position and compared with the distance traveled by backlight panel 20. This radical change in the inclination of backlight panel 20 as it undergoes a counter-clockwise rotation is necessary to enable panel 20 to enter the trunk in a horizontal position, thereby minimizing the wasted space and interference with storage trunk space in the trunk required for the repositioning. Backlight panel 20 follows the identical path, except that is moves from the stored horizontal position to the raised position.

The power source 60 is preferably a reversible push-pull electric motor which provides the power to move linkage mechanism 30 between the raised and the retracted positions. Energization of the electric drive motor in one direction will cause driver-track 34 to traverse horizontally along guideframe 50. Power means 60 is pivotally connected to the linkage mechanism 30.

Preferably, a teleflex cable 62 having a helical wound structure protruding on the outer surface of the cable (not shown), connects power source 60 to guideframe 50. Such cables are well known in the art (see, for example, U.S. Pat. No. 4,543,747). The wound structure engages a bevel gear, such that rotation of the gear causes translation of the cable. The cable is housed in a hollow, rigid conduit which supports and protects cable 62. The conduit also prevents movement of cable 62 during operation.

A conventional weather seal of rubber or ruber-like material mounted on the roof section engages the adjacent portion of the backlight panel into a sealing engagement when the panel and the roof section are in the raised position, providing an airtight and watertight seal when both the convertible roof and the panel are in the raised positions.

The preferred embodiment of the present invention comprises one backlight panel, a linkage mechanism located on each side of the panel, a guideframe which cooperates with each linkage mechanism, and a single power source which drives both linkage mechanisms. However, the principles described herein are also applicable to similar assemblies using two power sources, one to drive each linkage mechanism; or a backlight assembly consisting of only a single power source which drives a single mechanism.

While the invention has been described in conjunction with a specific embodiment, it is evident that many alternatives, modifications, and variations will be apparent to those skilled in the art in light of the disclosure herein. It is intended that all such alternatives, modifications, and variations are included herein that fall within the spirit and scope of the appended claims.

I claim:

1. A backlight assembly which is attachable to a roof section of a convertible vehicle, the vehicle having a right rear wheel well and a left rear wheel well separated by a distance, the vehicle having side walls, the assembly comprising:

(a) a backlight panel which attaches to the roof when the roof section and the panel are in a raised position, the backlight panel having a width that is almost the distance between the wheel wells;

(b) a pair of linkage mechanisms which are pivotally connected to the backlight panel, one linkage mechanism being disposed on each side of the backlight panel, each linkage mechanism having a driver-track, each driver-track being pivotally connected to the lower end of each linkage mechanism;

(c) means for pivoting power for the controlled movement of the backlight panel between the raised position and a retracted position; and (d) a pair of guideframes, one guideframe being disposed on each side of the backlight panel, each guideframe being fixedly mounted to side walls of the vehicle, the upper end of each linkage mechanism being pivotally connected to each side of the backlight panel, the lower end of each linkage mechanism operatively connected to one of the guideframes, each driver-track being slidably engaged with each guideframe, the power means being operatively connected to the driver-tracks for slidably movement of the driver-track along the guideframes;

wherein the linkage-mechanism positions the backlight panel in a substantially horizontal alignment detached from the roof section and under a decklid and above the wheel wells when the panel is in the retracted position.

2. The assembly of claim 1, wherein the driver-track slides in a substantially horizontal direction as the backlight panel moves between the raised position and the retracted position.

3. The assembly of claim 2, wherein the backlight panel undergoes a radical counterclockwise rotation as the panel moves into the retracted position, such that the panel enters the rear portion of the vehicle in a substantially horizontal position.

4. The assembly of claim 1, wherein the power means is electrically connected directly to the driver-track.

5. The assembly of claim 1, wherein the power means is a push-pull electrical drive motor.

* * * * *